S. W. EELLS.
Evaporating Pan.
No. 27,783. Patented Apr. 10, 1860.
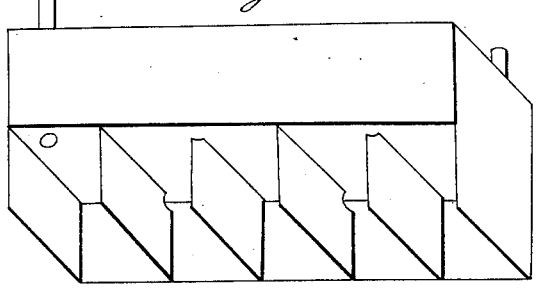
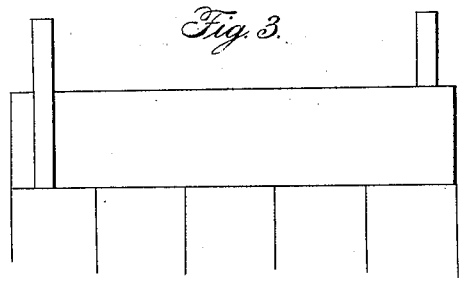
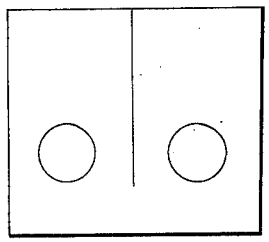
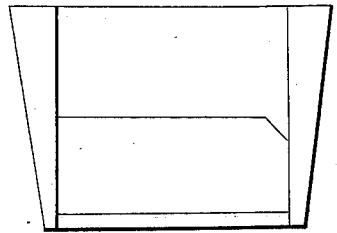
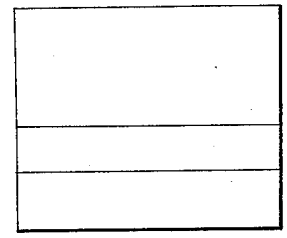
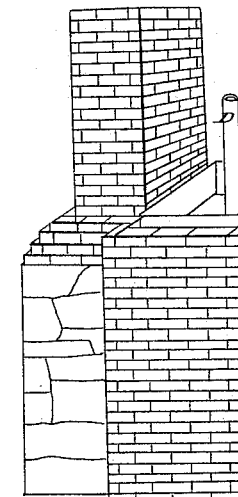
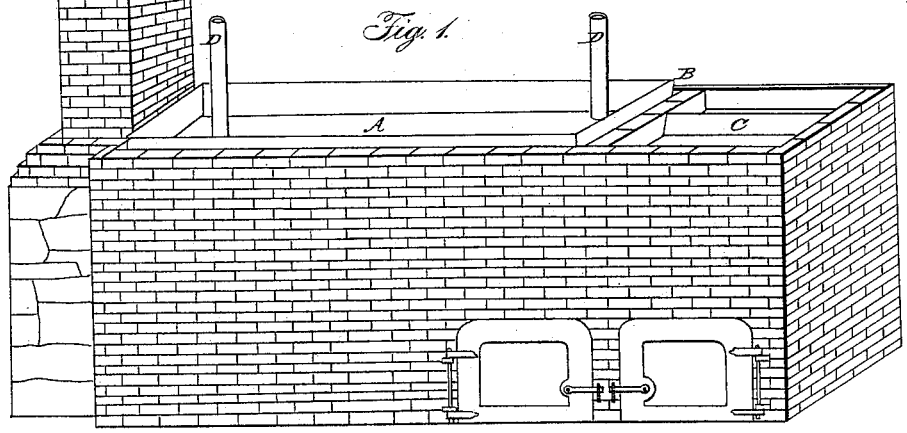
Witnesses:
Inventor:
AM. PHOTO-LITHO.CO. N.Y.(OSBORNE'S PROCESS.)

UNITED STATES PATENT OFFICE.

SETH W. EELLS, OF MANSFIELD, OHIO.

IMPROVEMENT IN APPARATUS FOR EVAPORATING SUGAR-JUICES.

Specification forming part of Letters Patent No. 27,783, dated April 10, 1860.

*To all whom it may concern:*

Be it known that I, S. W. EELLS, of Mansfield, in the county of Richland and State of Ohio, have invented a new and Improved Mode of Evaporating Cane-Juice and Graining Sugar; and I do hereby declare that the following is a full and exact description thereof, reference being had to the accompanying drawings, and to the letters of reference marked thereon.

The nature of my invention consists, first, in having an evaporating-pan for boiling and graining thick sirups, so constructed and arranged that there shall be no danger of overheating and burning the sirup or sugar, and this to be attained by having the evaporating-pan placed in another pan or vat containing fluid and made to boil, which will also cause the sirup to evaporate and boil without danger of burning it in-graining; secondly, in having a boiler constructed with one or more tubes passing through it to expose more surface of heat to the sirup, and same boiler also to have one or more partitions to separate somewhat and the better to manage the different stages of boiling sirup from the fresher cane-juice; thirdly, in having the apparatus so constructed that the steam from the boiling-tank may be conducted in tubes or pipes through tubs of fresh juice to raise the scum for purposes of defecation, and thereby economize the heat and fuel.

To enable others skilled in the art to construct and use this apparatus, I will proceed to describe its construction and operation.

The evaporating-pan A is a shallow vessel, made of galvanized iron or any suitable metal, the depth of which is six inches, more or less, and in width three feet by six in length, more or less, with sides and end pieces extending below the bottom any convenient distance—say four inches—and having one or more pieces extending across the under side of the bottom, thus forming different divisions. These cross-pieces support and strengthen the bottom of the evaporating-pan, and by the openings made in opposite ends of each alternate cross-piece the steam from the boiling-fluid, into which this pan is set, is enabled to pass off to the escape-tubes at each end of the evaporating-pan, and in this pan A the graining sirup can be stirred and converted into sugar without the danger of burning and rendering it dark.

The long boiler B, into which the evaporating-pan A is set, is made of sheet-iron or any suitable metal, twelve inches, (more or less,) in depth, and of a size suitable to admit the evaporating-pan A to be placed in it, leaving a suitable space around the inner or evaporating pan and between it and the sides of the outer pan or long boiler, to be filled with boiling fluid. The sides and ends of this long boiler are made somewhat flaring, and it is designed to contain fluid to protect the evaporating-pan A, which stands in it, from too great a degree of heat. The fluid with which this boiler B is supplied may be water or cane-juice, the latter of which might be boiling and thickening into sirup, and at the same time answer as the protecting medium to the graining sirup and sugar of the evaporating-pan standing in it. This boiler is to be suitably supported by masonry, so as to receive the fire underneath.

The partition-boiler C is made of copper or any other suitable metal, and in any convenient shape, capable of holding fifty gallons, more or less, and constructed with one or more partitions extending across its inside, and from the top to nearly the bottom, so as to divide the boiler into two or more apartments, leaving a little space at the bottom for the fluid in each apartment to run together. These apartments are for holding the cane-juice partially separate as it is boiling into sirup. This boiler is also constructed with one or more tubes passing through it, and these tubes are to allow the fire-draft to pass through them, for the purpose of exposing more heating-surface to the fluid, and consequently producing a more rapid evaporation. This boiler is to be placed at the end of long boiler B, and supported by a continuation of the same masonry. This partition-boiler C is so arranged as to admit the fire directly under it and the fire-draft to pass through the tubes before mentioned, then under the long boiler B, and out at the chimney, which is situated at the end of the furnace opposite the boiler C. This long boiler B may also be used when there is no fire under partition-boiler C. The sirup in partition-boiler C is taken from the apartment containing that which is most boiled and passed into the evaporating-pan A by means of a siphon-pump or its equivalent.

At both ends of the evaporating-pan A is placed a tube, D D, to admit the escape of steam generated from the boiling fluid underneath the pan; and for the purpose of economizing heat and fuel this steam may be conducted through a tub or tank of fresh juice by means of a tube or pipe passing downward through the tub and several times coiled around on its inside, thus heating the juice with the steam evolved from the fluid in boiler B, for the purpose of defecating previous to its being admitted into either boiler. The steam is designed to be used from but one of these tubes D D at a time, and when the least heat is wanted at the end farthest from the fire the steam is taken off from the opposite end.

What I claim as my invention, and desire to secure by Letters Patent, is—

1. The evaporating-pan for boiling thick sirup and graining sugar, such pan being placed in another pan or vat containing fluid, substantially as described, that the danger of burning or overheating the graining-sugar may be obviated.

2. The application of the principle of using tubes in the boiler, substantially as described, to increase the heating-surface for evaporating cane-juice, thereby expediting the process and economizing space.

3. I do not claim passing tubes through a boiler to increase the heating-surface, for this is used in steam-boilers; but I do claim the application of this principle to the purpose of evaporating cane-juice or sugar, substantially as described.

SETH W. EELLS.

Witnesses:
  B. H. LYMAN,
  J. E. BARBOUR.